Patented Feb. 27, 1951

2,543,530

UNITED STATES PATENT OFFICE 2,543,530

TREATMENT OF POLYMERIC CHLORO-TRIFLUOROETHYLENE

Edward L. Kropa, Old Greenwich, and John J. Padbury, Stamford, Conn., assignors to American Cyanamid Company, New York, N. Y., a corporation of Maine No Drawing. Application May 2, 1947, Serial No. 745,646

1 Claim. (Cl. 260—653)

This invention relates to the treatment of polymeric chlorotrifluoroethylene. More particularly the invention is concerned with the pyrolytic treatment of polymers (including solid polymers) of chlorotrifluoroethylene, whereby monomeric chlorotrifluoroethylene is obtained together with other useful products, e. g., a composition comprising a mixture of chlorofluorocarbons, which mixture is a liquid boiling within the range of 25° C. at 760 mm. pressure to 102° C. at 1 mm. pressure and having a refractive index at 25° C. of approximately 1.37. This liquid is especially adapted for use as a heat-exchange medium, especially for heat exchange at low temperatures, as a low-temperature lubricant, and as a source of new chlorofluorocarbons, e. g., an unsaturated dimer of chlorotrifluoroethylene, an unsaturated trimer of chlorotrifluoroethylene, an unsaturated tetramer of chlorotrifluoroethylene, etc.

In practicing our invention polymeric chlorotrifluoroethylene, which may be scrap polymer obtained as a by-product of molding or otherwise shaping or fabricating polymeric chlorotrifluoroethylene, is heated to a pyrolysis temperature, more particularly to a maximum temperature of about 800° C., and the pyrolysis products are then isolated, e. g., by fractional condensation. The pyrolysis may be effected in an inert atmosphere, e. g., in an atmosphere of nitrogen, or in an oxygen-containing atmosphere, e. g., oxygen itself or air.

It was suggested prior to our invention that polymeric tetrafluoroethylene be pyrolyzed. The object of such pyrolysis was to obtain (1) compounds represented by the general formula $C_nF_{2n}$, where $n$ represents an integer which is at least 2, which compounds boil within the range of about −76° C. to about +82° C. (e. g., hexafluorocyclopropane), and (2) low-melting polymers of tetrafluoroethylene.

It is a primary object of the present invention to obtain monomeric chlorotrifluoroethylene and other compounds containing chlorine and fluorine from polymeric chlorotrifluoroethylene. The monomer may be re-polymerized to the polymer or it may be used for other purposes. The other pyrolysis products may be used alone or in the form of admixtures, for example (depending upon their particular properties) as solvents, heat-exchange media, lubricants, lubricating oil additives, electrical insulation media, modifiers in the preparation of flameproofing compositions, intermediates in the preparation of other compositions, etc. The pure or substantially pure chlorofluorocarbons which can be isolated, if desired, e. g., by distillation, from the crude mixture of pyrolysis products may be used as intermediates in the preparation of other compounds, as refrigerants, etc.

Another object of the present invention is to obtain monomeric chlorotrifluoroethylene and other chlorofluorocarbons from polymeric chlorotrifluoroethylene at a relatively low cost.

Another object of the invention is to obtain relatively high yields of monomeric chlorotrifluoroethylene from solid polymeric chlorotrifluoroethylene.

Another object of the invention is to obtain monomeric chlorotrifluoroethylene and other valuable products from scrap or degraded scrap polymer obtained as a by-product of the fabrication of polymeric chlorotrifluoroethylene.

Another object of the invention is to provide a rapid, efficient and economical method of obtaining conversion products of polymeric chlorotrifluoroethylene, whereby both new and old chlorofluorocarbons can be obtained.

Other objects of the invention will be apparent to those skilled in the art from the following more detailed description.

The foregoing objects are attained by heating polymeric chlorotrifluoroethylene as broadly described in the first and second paragraphs of this specification and more specifically hereafter. Thus, we may effect pyrolysis of polymeric chlorotrifluoroethylene, including scrap polymeric chlorotrifluoroethylene of the kind aforementioned, at a temperature within the range of about 250° C., more particularly about 300° C., to about 750° C., or even as high as about 800° C., and isolate the pyrolysis products. In general, the scrap or other form of polymeric chlorotrifluoroethylene, as for example a solid polymer of chlorotrifluoroethylene, is heated to a temperature within the range of about 300° or 350° C. to about 750° or 800° C. for a period of time sufficient to convert at least some of the polymeric chlorotrifluoroethylene to monomeric chlorotrifluoroethylene, which thereafter is isolated, e. g., by fractional condensation or by distillation of the crude or partially fractionated pyrolysis products containing the said monomer. Good results have been obtained by heating solid polymeric chlorotrifluoroethylene at a temperature within the range of about 350° C. to about 800° C., more particularly within the range of about 400° C. to 700° C., for a period of time sufficient to obtain monomeric chlorotrifluoroethylene and other pyrolysis products of polymeric chlorotrifluoroethylene, and thereafter separating the monomeric chlorotrifluoroethylene from the other pyrolysis products.

In accordance with a preferred embodiment of our invention we heat a solid polymer of chlorotrifluoroethylene, e. g., scrap polymer obtained as a by-product of the fabrication, for instance injection molding, of polymeric chlorotrifluoroethylene, at a temperature within the range of about 350° C. to about 800° C., more particularly within the range of about 400° or 450° C. to about 600° or 650° C., until no more thermal decomposition occurs and then fractionally condense the pyrolysis products to obtain (1) monomeric chlorotrifluoroethylene as one fraction and (2) another fraction of liquid pyrolysis products which are condensable at 0° C. The liquid pyrolysis products of (2) are washed to remove acids therefrom, e. g., by washing first with water followed by washing with an aqueous alkaline solution such, for instance, as a dilute solution of sodium or potassium carbonate or bicarbonate. The washed fraction is treated to remove traces of moisture therefrom, e. g., by allowing it to stand in contact with anhydrous sodium or calcium sulfate. The substantially anhydrous liquid is then distilled to obtain a small amount of monomeric chlorotrifluoroethylene and a liquid boiling within the range of 25° C. at 760 mm. pressure to 102° C. at 1 mm. pressure. The residue, which resembles a soft grease in consistency and feel, is adapted for use as a lubricant.

The pyrolysis products initially obtained, as by condensation of the gaseous products from the reaction zone, may be separated into cuts or fractions by known methods, e. g., by distillation. These fractions can be used as such, e. g., as solvents, heat- or cold-transfer media, polymerization intermediates, etc.; or, if desired, they can be redistilled to obtain pure or substantially pure chlorofluorocarbons, including dimers, trimers, tetramers, pentamers, hexamers, heptamers, octamers, etc. (both acyclic and alicyclic), of chlorotrifluoroethylene, as well as various addition and rearrangement products of such dimers, trimers, tetramers, etc.

The period of time the polymeric chlorotrifluoroethylene is at the reaction or pyrolysis temperature in all cases is sufficient to cause pyrolysis or conversion to take place. It will be understood, of course, that the time and temperature of heating may be varied widely, as desired or as conditions may require, depending upon such influencing factors as, for example, the particular characteristics of the starting polymeric material, the extent of the degradation of the polymer to the monomer or to lower polymers that is desired, whether or not products produced by side reactions are desired, etc.

The conversion or pyrolysis may be effected by continuous, semi-continuous or batch operations at atmospheric, subatmospheric, or superatmospheric pressures, but atmospheric pressure generally is used. If pressures above atmospheric be employed, they may range, for example, from 20 to 1000 pounds or more per square inch. If an optimum yield of oily pyrolysis products be desired, a reduced pressure advantageously may be used.

The polymeric chlorotrifluoroethylene may be heated as hereinbefore described while admixed with or in an atmosphere of nitrogen, argon, helium, carbon dioxide or other inert gas, or while admixed with or in an oxygen-containing atmosphere, e. g., oxygen itself or air. The polymeric chlorotrifluoroethylene also may be heated while admixed with or in an atmosphere of such agents as, for example, chlorine, fluorine, mixtures of chlorine or fluorine, known compounds of chlorine and fluorine (e. g., chlorine trifluoride), and compounds of chlorine or fluorine which are known to yield chlorine or fluorine on heating, e. g., antimony trichloride, antimony pentachloride, phosphorus pentachloride, antimony chlorofluorides, cobaltic fluoride, silver difluoride, etc. Several advantages result from introducing chlorine, fluorine, mixtures or compounds thereof, or chlorine- or fluorine-yielding compounds into the reaction zone along with the polymeric chlorotrifluoroethylene, among which may be mentioned their catalytic effect in causing disproportionation (that is, a change in percentage composition) to take place and the fact that they tend to alter appreciably the contact time or the temperature or both in obtaining an optimum yield of a particular chlorofluorocarbon by pyrolysis of polymeric chlorotrifluoroethylene. When polymeric chlorotrifluoroethylene is heated with chlorine, fluorine, mixtures or compounds thereof, or chlorine- or fluorine-yielding compounds, such an agent may constitute, for example, from 0.1 to 20% or more by weight of the polymeric chlorotrifluoroethylene undergoing pyrolysis.

The reaction vessel or reaction tube may be formed of or lined with any suitable material, preferably a corrosion-resistant or inert material, for instance carbon, nickel, nickel alloys (e. g., nickel-copper-iron alloys, nickel-copper-aluminum-silicon alloys, etc.), cobalt, cobalt alloys, silver, platinum, glass, etc.

In certain cases superior results may be secured by mixing the polymeric chlorotrifluoroethylene prior to cracking or pyrolysis with various finely divided metals, more particularly heat-conducting metals, e. g., powdered or granulated copper, nickel, cobalt and aluminum, as well as iron in the form of powder or filings, etc. Such finely divided metals increase the heat conductivity of the mass and tend to accelerate the process of decomposition. Some metals, more particularly finely divided iron, e. g., powdered iron, may act as a catalyst in the reaction. In order to decrease any foaming tendencies during pyrolysis, the polymer may be mixed with various finely divided, inert materials, e. g., sand, powdered quartz, powdered or granulated silicon carbide, etc. Mixtures of such inert materials and finely divided heat-conducting and/or catalytically effective metals may be used if desired.

Any suitable heating means may be employed.

In order that those skilled in the art better may understand how the present invention may be carried into effect, the following examples are given by way of illustration and not by way of limitation. All parts are by weight unless otherwise stated.

EXAMPLE 1

A combustion tube was arranged in series with three traps. The first trap was cooled in ice water, the second in Dry Ice (solid carbon dioxide), while the final trap contained water. Five parts of solid polymeric chlorotrifluoroethylene was placed in the combustion tube, and a slow stream of air was passed through the system. Upon heating the tube with a Bunsen flame, the polymer melted at a temperature of about 210° C., and decomposition started as evidenced by gassing and the appearance of yellow fumes. Heating was continued at a temperature within the range of about 400° C. to about 650° C. until all of the polymer had been decomposed. The end of the combustion tube most remote from the hot zone contained a substantial amount of yellow, grease-like pyrolysis products. The ice-cooled trap contained approximately 0.5 part by volume of yellow, liquid pyrolysis products. Approximately 3.5 parts of clear liquid, which was identified as monomeric chlorotrifluoroethylene, was condensed in the Dry-Ice trap. In the water in the final trap was dissolved some acidic material which gave a positive test for chloride.

EXAMPLE 2

A Pyrex glass tube, 1½ inches in diameter and 12 inches long, arranged at an angle of approximately 45°, was fitted with a two-hole rubber stopper holding a gas-inlet tube and an exit tube connected to a trap cooled in Dry Ice. In the Pyrex tube was placed 50 parts of solid polymeric chlorotrifluoroethylene, which had been prepared by polymerization of the monomer in the presence of acetyl peroxide. This polymer was characterized by a twin arc in an oriented sample as determined by X-ray diffraction analysis. The system was flushed out with dry nitrogen and a slow stream of nitrogen was passed through during the run. The polymer was heated moderately at first (below 350° C.) and then at a higher temperature within the range of about 400° C. to about 650° C. until decomposition of the polymer was substantially complete.

Forty-seven and five-tenths (47.5) parts of brown, liquid pyrolysis products including monomeric chlorotrifluoroethylene was collected in the Dry Ice-cooled trap. The low-boiling material in this brown liquid was allowed to evaporate at atmospheric pressure and the gas was passed through a train consisting of two wash bottles containing 25% potassium hydroxide solution, a drying tower packed with soda lime, and finally through a tube containing anhydrous calcium sulfate. The yield of purified material was 29.8 parts, or approximately 60% by weight of the polymer which was pyrolyzed. Infrared analysis established that this material was monomeric chlorotrifluoroethylene having a high degree of purity. A sample of this monomer, into which was incorporated a small amount of acetyl peroxide as a polymerization catalyst, polymerized satisfactorily to a solid polymer of chlorotrifluoroethylene.

The liquid mixture of pyrolysis products remaining in the trap and which amounted to 17.7 parts was washed once with water, then with a 5% solution of sodium bicarbonate, after which it was dried over anhydrous calcium sulfate. Ten parts of the washed and dried material was distilled to obtain 5.8 parts of a slightly yellow distillate comprising a mixture of chlorofluorocarbons and boiling within the range of 74° to 230° C. at atmospheric pressure. The residue was a dark, viscous mass.

EXAMPLE 3

Thirty-five parts of solid polymeric chlorotrifluoroethylene was pyrolyzed in essentially the same manner as described under Example 2. This polymer, which was prepared by polymerization of the monomer in the presence of tert.-butyl hydroperoxide, was characterized by quadruple arcs in an oriented sample as determined by X-ray diffraction analysis. Thirty- one and eight-tenth (31.8) parts of brown, liquid pyrolysis products was collected in the trap cooled in Dry Ice. The low-boiling material in this brown liquid was purified as described under Example 2. The yield of purified material amounted to 21 parts or 60% by weight of the polymer which was pyrolyzed. Infrared analysis established that this material was monomeric chlorotrifluoroethylene having a high degree of purity.

EXAMPLE 4

In suitable pressure equipment, 57,700 parts of chlorotrifluoroethylene containing 0.5% by weight thereof of acetyl peroxide was maintained at about 25° C. for 25 days. After venting off unreacted monomer, there was obtained 52,300 parts of solid, white polymer of chlorotrifluoroethylene. This polymer was coarsely ground in an impact cutter, extracted with acetone and dried thoroughly in a vacuum oven at 75° C. Standard ½" x ½" x 5" test bars were molded from the polymeric chlorotrifluoroethylene in a commercial injection molding machine by forcing the polymer heated to a temperature of about 480° F. under a pressure of about 29,000 pounds per square inch into a cooled mold held at 165° F. The molded test bars showed the following properties:

| | |
|---|---|
| Specific gravity | 2.1 |
| A. S. T. M. heat distortion value, °C | 75–82 |
| Tensile strength, pounds per square inch | 5000–6600 |
| Flexural strength, pounds per square inch | 4300–5400 |
| Izod impact strength, ft. lbs. per inch | 0.98–1.58 |

The sprues, gates and other scrap from the injection molding operation were ground in an impact cutter.

An apparatus was arranged for the thermal decomposition or pyrolysis of the scrap polymeric chlorotrifluoroethylene. This consisted of a glass reaction vessel for holding the polymer, which vessel was so arranged that it could be heated by gas burners. The vessel containing the polymer was connected to two receivers in series, the first of which was cooled to 0° C. for the collection of the higher boiling pyrolysis products, and the second cooled to —78° C. to trap the lower boiling products of pyrolysis.

Six hundred and eighty-one (681) parts of scrap polymer of chlorotrifluoroethylene obtained as above described was heated in the reaction vessel while passing a slow stream of nitrogen therethrough, to a temperature within the range of about 400° C. to about 650° C. until cracking or pyrolysis was complete and no more material was collected in the receivers. There was collected 223 parts of a brown somewhat viscous liquid comprising a mixture of chlorofluorocarbons in the receiver held at 0° C. Almost all of the remainder of the scrap polymer was pyrolyzed to monomeric chlorotrifluoroethylene (B. P. —28° C.) and was collected in the receiver held at —78° C. The liquid product from the first receiver, together with 38 parts of liquid residue remaining after removal of the monomer from the material collected in the —78° C. receiver, was washed twice with water and then with a 5% aqueous solution of sodium bicarbonate to remove acids, after which it was dried by allowing it to stand over anhydrous sodium sulfate for about 65 hours.

One hundred and ninety-three (193) parts of the washed and dried liquid was distilled to obtain 24 parts of a colorless liquid boiling below 25° C. and having a refractive index at 25° C. of 1.3458; 60 parts of a slightly yellow liquid boiling within the range of from 25° C. at 760 mm. pressure to 102° C. at 1 mm. pressure and having a refractive index at 25° C. of 1.3742; and 105 parts of residue, which was an amber-colored liquid while hot but was too viscous to pour while cold. Its index of refraction at 25° C. was 1.4081. When cold, it had the feel and consistency of a soft grease and is adapted for use as a lubricant. The high-boiling liquid fraction is adapted for use as a heat-exchange medium. The cuts obtained upon subjecting this fraction to redistillation through a Podbielniak column having approximately 100 theoretical plates and data on these cuts are shown in Table I.

*Table I*

| Cut | Temp., °C. | Pressure, mm. | Per Cent Distilled | $n_D^{25}$ | Additional Data |
|---|---|---|---|---|---|
| 1 | 64 | 760 | 3.4 | 1.3415 | 28.4% Cl |
| 2 | 64 | 760 | 5.8 | 1.3373 | Mol. Wt. 245; 32.4% Cl |
| 3 | 63 | 760 | 8.6 | 1.3368 | 29.9% Cl |
| 4 | 66 | 760 | 11.6 | 1.3379 | |
| 5 | 70 | 760 | 14.5 | 1.3379 | |
| 6 | 108 | 760 | 17.8 | 1.3569 | |
| 7 | 108 | 760 | 20.0 | 1.3779 | |
| 8 | 58 | 60 | 22.0 | 1.3726 | |
| 9 | 60 | 60 | 24.8 | 1.3706 | |
| 10 | 60 | 58 | 27.8 | 1.3695 | |
| 11 | 62 | 60 | 30.4 | 1.3662 | 30.8% Cl |
| 12 | 66 | 60 | 33.2 | 1.3636 | |
| 13 | 66 | 60 | 34.0 | 1.3634 | |
| 14 | 72 | 59 | 37.0 | 1.3653 | Mol. Wt. 363 |
| 15 | 75 | 59 | 40.0 | 1.3652 | |
| 16 | 79 | 59 | 42.5 | 1.3638 | |
| 17 | 85 | 59 | 45.5 | 1.3644 | |
| 18 | 83 | 59 | 49.0 | 1.3650 | |
| 19 | 98 | 59 | 52.1 | 1.3676 | |
| 20 | 104 | 59 | 55.0 | 1.3810 | |
| 21 | 111 | 59 | 57.8 | 1.3890 | |
| 22 | 95 | 20 | 60.9 | 1.3852 | |
| 23 | 100 | 20 | 64.7 | 1.3823 | 28.9% Cl |
| 24 | 98 | 20 | 68.0 | 1.3808 | Mol. Wt. 481 |
| 25 | 108 | 20 | 71.4 | 1.3801 | |
| 26 | 105 | 20 | 73.2 | 1.3792 | |
| Residue | | | (87.0) | 1.3932 | |

Cuts 1, 4, 12 and 22 were analyzed by infrared spectroscopy. These cuts were each relatively pure unsaturated chlorofluorocarbon. Cut 4 was a substantially pure unsaturated dimer (acyclic dimer) of chlorotrifluoroethylene ($C_2Cl_2F_6$) such as is designated as H of cut 24 shown in Table III of our copending application Serial No. 745,645, now abandoned filed concurrently herewith. Since the molecular weights of the trimer and tetramer of chlorotrifluoroethylene are, respectively, 348.5 and 466.0 it is apparent that cuts 14 and 24 comprise substantial quantities of trimeric chlorotrifluoroethylene ($C_3Cl_3F_9$) and tetrameric chlorotrifluoroethylene ($C_4Cl_4F_{12}$), respectively. The results of analyses by infrared spectroscopy showing that cuts 12 and 22 are relatively pure unsaturated chlorofluorocarbons indicate, when considered in connection with (1) the molecular weights of cuts 14 and 24, (2) the calculated molecular weights of the trimer and tetramer of chlorotrifluoroethylene and (3) the respective boiling points, that cuts 12 and 22 are composed substantially of unsaturated trimer and unsaturated tetramer, respectively, of chlorotrifluoroethylene and that cuts 14 and 24 comprise mainly said unsaturated trimer and tetramer.

Instead of using scrap polymeric chlorotrifluoroethylene obtained as a by-product of a molding operation, we may use other scrap polymer of chlorotrifluoroethylene and obtain therefrom a high yield of monomer as well as other chlorofluorocarbons by pyrolyzing the same as hereinbefore described. For example, we may use scrap polymeric chlorotrifluoroethylene obtained in the manufacture or in the fabrication of cellular or foamed polymeric chlorotrifluoroethylene. Such cellular polymer may be produced, for instance, by heating a mixture of powdered resin and foaming agent, e. g., ammonium carbonate, sodium or ammonium bicarbonate, etc., in a mold and allowing the mixture to expand.

EXAMPLE 5

The same apparatus and procedure were followed in pyrolyzing 1274 parts of scrap polymeric chlorotrifluoroethylene as described under Example 4 to obtain 633 parts of monomeric chlorotrifluoroethylene and 453 parts of liquid pyrolysis products. The latter was redistilled to separate the following fractions:

| Cut | Temperature and Pressure | Parts | Molecular Weight |
|---|---|---|---|
| 1 | 46° C. to 182° C. at 760 mm. | 103 | |
| 2 | 80° C. at 20 mm. to 140° C. at 0.4 mm. | 75 | 520 (Av. of 2 detmns.) |
| 3 | 139° C. at 0.3 mm. to 268° C. at 1.8 mm. | 151 | 1060 (Av. of 2 detmns.) |
| 4 | 268° C. at 1.5 mm. to 310° C. at 10 mm. | 55 | 1320 (Av. of 3 detmns.) |
| Residue | | 34 | |

Cut 1 was a slightly turbid, yellow, non-viscous liquid. Cut 2 was a yellow, non-viscous liquid containing some crystalline-like material that had collected in the condenser and was melted therefrom. Cut 3 was a clear amber-colored viscous liquid, its viscosity at room temperature being of the order of that of glycerine. Cut 4 was an opaque, yellow, waxy solid at room temperature. Its hardness was about like that of paraffin wax. The residue was a hard, black mass. A sample of the residue was fluorinated by contacting with elementary fluorine for 5 hours at 195° C., then for 2½ hours at 160° C., and finally for 2 hours at 195° C., yielding an opaque, almost colorless product which was more brittle than the starting material. Fluorination of cuts 2 and 3 yielded colorless products which were more viscous and possessed a higher molecular weight than the original cut. If desired, the fluorinated cuts or the fluorinated residue may be pyrolyzed as hereinbefore described to obtain various fluoro, more particularly chlorofluoro, pyrolysis products.

The unsaturation of the unsaturated chlorofluorocarbons obtained by pyrolysis of polymeric chlorotrifluoroethylene, such, for example, as the cuts and residue produced as above described, may be lessened or destroyed by methods other than fluorination. By subjecting the unsaturated chlorofluorocarbons or mixtures thereof to the action of strong oxidizing agents, e. g., potassium permanganate, sodium dichromate, a mixture of chromic and sulfuric acids, nitric acid, ozone, etc., various oxidation products, more particularly acids, are formed. Such chlorofluoroacids may be employed, for instance in the form of their salts or esters, as wetting and emulsifying agents for various systems including fluorocarbon-water systems, fluorocarbon-hydrocarbon systems and fluorocarbon-hydrocarbon-water systems.

EXAMPLE 6

An apparatus was arranged for the pyrolysis of polymeric chlorotrifluoroethylene by means of an electrically heated element. The source of heat was from a coil of Nichrome wire enclosed in a glass desiccator. Coarsely ground scrap polymer obtained as a by-product of the injection molding of polymeric chlorotrifluoroethylene was placed in contact with the heating element. A system of receivers was connected to the pyrolysis vessel for collection of the pyrolysis products. The apparatus was flushed with nitrogen and the coil maintained below red heat. From 234 parts of polymer there were obtained 100 parts of monomeric chlorotrifluoroethylene, 89 parts of a mixture of chlorofluorocarbons, which mixture was liquid at room temperature, and 30 parts of unpyrolyzed polymer.

Liquid mixtures of chlorofluorocarbons such as are produced in accordance with the present invention, and which are more specifically described in the first paragraph of this specification and elsewhere herein, are particularly suitable for use as solvents (at elevated temperatures) and as plasticizers for polymeric chlorotrifluoroethylene including the solid polymers thereof such as hereinbefore have been set forth, more particularly in the various examples. On cooling to room temperature the solution of the polymer forms a gel. Instead of using the liquid pyrolysis product having a broad boiling range which is mentioned in the first paragraph hereof and elsewhere in this specification, the product may be topped in order to remove the more volatile components, e. g., those boiling up to 110° C. at atmospheric pressure. Alternatively various intermediate cuts may be used.

Such cuts or fractions also may be fluorinated by treatment with elementary fluorine as hereinbefore described thereby to obtain colorless or substantially colorless products, and these materials then may be used hot as solvents or plasticizers for polymeric chlorotrifluoroethylene in the same manner as the liquid which has not been subjected to the action of elementary fluorine. Or, if desired, solutions of the solid polymeric chlorotrifluoroethylene in the liquid chlorofluorocarbon may be fluorinated to obtain colorless liquids especially suited for fiber-forming and other applications.

For most rapid solution of the polymer it is preferable that it be in a finely divided state, e. g., a particle size such that all or substantially all of it will pass through a U. S. Standard Sieve Series No. 100 mesh screen. One method of comminuting the polymer to a suitable size is by wet grinding in water.

The solutions of the polymeric chlorotrifluoroethylene may be extruded hot in the form of filaments, fibers, rods, tubing, sheets, etc., or upon a core, more particularly glass or a conducting core, e. g., a copper wire, as insulation therefor, whereupon the chlorofluorocarbon solvent is removed either by evaporation or by solvent extraction. The diluted solutions also may be employed as coating compositions, particularly for application to heated articles at elevated temperatures, or as components of coating compositions, as dielectric media, molding compositions, impregnating agents, e. g., coil impregnants, laminating compositions, particularly as binders for woven or matted glass cloth, felted or sheet asbestos cloth, etc., as binders for mica, as binders for solid polymeric chlorotrifluoroethylene, tetrafluoroethylene and other solid polymeric fluoroalkenes in sheet, granular or other form, as components of flameproofing compositions, etc. The solutions of the polymeric chlorotrifluoroethylene also may be used as additives to halogen-containing lubricating oils, e. g., for the purpose of controlling the viscosity index of such oils.

Instead of pyrolyzing a polymer of chlorotrifluoroethylene as hereinbefore described, we may pyrolyze a solution of such a polymer, more particularly a chlorofluorocarbon solution of the polymer of the kind which has just been mentioned.

In addition to monomeric chlorotrifluoroethylene, the products obtained by the pyrolysis of polymeric chlorotrifluoroethylene as hereinbefore described include polymers of lower molecular weight than the polymer which was pyrolyzed, which low-molecular-weight polymers may be obtained in the form of oils, greases, waxes, etc. They also may include thermal reaction products of the regenerated monomer. Thus, the pyrolysis products may include compounds such as those mentioned in Table IV of our copending application Serial No. 745,645, filed concurrently herewith.

We claim:

The method which comprises heating scrap polymer obtained as a by-product of the molding of polymeric chlorotrifluoroethylene, said heating being effected at a temperature within the range of about 400° C. to about 650° C. until no more thermal decomposition occurs, passing the pyrolysis products through a condenser system having two receivers in series, the first receiver being held at a temperature of about 0° C. to condense a relatively high boiling fraction and the second receiver being held at a temperature low enough to condense monomeric chlorotrifluoroethylene, washing the said relatively high boiling fraction to remove acids therefrom, treating the washed fraction to remove traces of moisture therefrom, and distilling the resulting material to obtain a liquid boiling within the range of 25° C. at 760 mm. pressure to 102° C. at 1 mm. pressure and having a refractive index at 25° C. of approximately 1.37.

EDWARD L. KROPA.
JOHN J. PADBURY.

REFERENCES CITED

The following references are of record in the file of this patent:

UNITED STATES PATENTS

| Number | Name | Date |
|---|---|---|
| 2,394,581 | Benning et al. | Feb. 12, 1946 |
| 2,406,153 | Lewis | Aug. 20, 1946 |
| 2,420,222 | Benning et al. | May 6, 1947 |